United States Patent [19]
Isono et al.

[11] Patent Number: 6,030,474
[45] Date of Patent: Feb. 29, 2000

[54] INFORMATION CARD COATING METHOD

[75] Inventors: Hajime Isono; Kenji Ueno, both of Yamanashi-ken; Takehito Kobayashi, Nirasaki; Ken'Ichi Yui, Kofu; Teruo Tsunoda, Yamanashi-ken, all of Japan

[73] Assignee: Nisca Corporation, Yamanashi-ken, Japan

[21] Appl. No.: 08/758,964

[22] Filed: Dec. 2, 1996

[30] Foreign Application Priority Data

Nov. 30, 1995 [JP] Japan .................................. 7-312254
Aug. 30, 1996 [JP] Japan .................................. 8-248669

[51] Int. Cl.$^7$ .................................................. B32B 31/00
[52] U.S. Cl. .................... 156/64; 156/238; 156/308.02; 156/358; 156/359; 156/379; 427/147; 427/148
[58] Field of Search .................................. 156/238, 351, 156/359, 358, 230, 233, 64, 235, 240, 239, 277, 297, 308.2, 361, 379; 427/147, 148

[56] References Cited

U.S. PATENT DOCUMENTS

| | | | |
|---|---|---|---|
| 4,684,795 | 8/1987 | Colgate, Jr. .............................. | 235/457 |
| 4,999,075 | 3/1991 | Coburn, Jr. .............................. | 156/209 |
| 5,000,809 | 3/1991 | Adesko et al. .......................... | 156/230 |
| 5,201,976 | 4/1993 | Eastin ..................................... | 156/152 |
| 5,275,684 | 1/1994 | Marazzi et al. ......................... | 156/359 |
| 5,316,608 | 5/1994 | Ocampo et al. ........................ | 156/230 |
| 5,437,960 | 8/1995 | Nagate et al. ........................... | 430/256 |
| 5,484,502 | 1/1996 | Bozanic ................................... | 156/235 |
| 5,486,254 | 1/1996 | Gallagher et al. ...................... | 156/229 |
| 5,636,928 | 6/1997 | Shiina et al. ............................ | 400/636 |
| 5,637,174 | 6/1997 | Field et al. .............................. | 156/256 |
| 5,718,523 | 2/1998 | Shiina et al. ........................ | 400/120.04 |
| 5,806,999 | 9/1998 | Kobayashi .............................. | 400/188 |

*Primary Examiner*—Richard Crispino
*Assistant Examiner*—Linda L Gray
*Attorney, Agent, or Firm*—Kane, Dalsimer, Sullivan and Levy, LLP

[57] ABSTRACT

In a method for coating the recording surface of an information card by selectively using one of protective films of various types, the selected protective film loaded in a coating device is thermally transferred to the card at the optimal thermal-transfer temperature and optimal feeding speed determined according to the film type of the loaded protective film which is automatically identified. The film type of the protective film is recognized by detecting at least one discrimination mark on a film ribbon for the protective film by use of one or more mark sensors. The discrimination mark also serves as positioning means for the protective film in coating. By thermally transferring the protective film to the card at the optimal thermal-transfer temperature and optimal feeding speed, a high-quality information card coated with flat layers including printing ink layers and protective films and having excellent peel strength can be produced.

8 Claims, 9 Drawing Sheets

INFORMATION CARD COATING METHOD

BACKGROUND OF THE INVENTION

1. Field of the Invention

This invention relates to a device and method for protectively coating the print recording surface of an information card such as a credit card and identification card, and more particularly to an information card coating device and method for coating, with a protective film, a card having a recording surface on which information data are printed or recorded.

2. Description of the Prior Art

A variety of types of identification cards (ID cards) such as a license card and a credit card which have been indispensable to social life each have an information recording surface on which information patterns such as the photograph of a cardholder's face, a cardholder's name, and/or a cardholder's identification code number are printed by using a card printer. It is desirable to print, on the recording surface of the card, multiple gradation images such as full-color photographs with dye-sublimation thermal transfer inks, and two-gradation images such as characters with a thermal-wax transfer ink. Anyhow, such information cards must be coated with a protective film for the purpose of protecting the recording surface having information data printed and preventing falsification.

The protective film used as a coating on the information recording surface of the card is generally made of transparent hot-melt plastic film having a thickness of several microns to several ten microns or a high-strength reinforced plastic film with a hot-melt adhesive layer. It is preferable to thermally transfer such a protective reinforced plastic film to the recording surface of the card with heat while being brought into press contact with the card inasmuch as the protective film is fused with heat to merge with the card base, thus to prevent falsification of the card.

The various protective films as mentioned above are formed of materials different in quality and heat characteristic according to the purpose for which the card is used. Furthermore, there is a fair possibility of appearance of new material more suitably applicable to a protective film for information cards. However, the protective films of various types as noted above must not be treated at a fixed temperature.

In a case of using a protective film having a hologram pattern for preventing falsification of the card, a chemical reaction possibly takes place when plasticizing material constituting an adhesive layer of such a hologram protective film comes into touch with the dye-sublimation inks usually used for printing a full-color photographic image on the recording surface of the card, consequently causing diffusion of dye. As a result, possible bleeding of the images printed on the card occurs, as the case may be. In order to surmount the disadvantage, it is necessary to interpose a thin separator film between the recording surface of the card and the hologram film.

It has been desired to affix at least one protective coating film onto the recording surface of the card under the appropriate conditions of thermal-transfer temperature and feeding speed conformable to the material of the protective film so as not to allow the protective film to easily come off the card. Further, the layers of printing inks and the protective films affixed on the card is required not to make conspicuous difference in surface level on the card, which is awkward to touch.

OBJECT OF THE INVENTION

An object of the present invention is to provide an information card coating device and method capable of coating the recording surface of an information card with a protective film such as a reinforced film and a film with hologram images under appropriate conditions so as to easily and reliably protect the recording surface of the information card.

Another object of the present invention is to provide an information card coating method capable of arbitrarily or automatically determining coating conditions pertinent to the material of the protective film to be thermally transferred to the recording surface of the information card in accordance with the material and solid state properties of the protective film, and a device capable of easily and stably practicing the coating method.

Still another object of the invention is to provide an information card coating device and method capable of affixing a protective film onto the prescribed area defined on the recording surface of a card base exactly without causing dislocation, thus producing a high quality information card.

Yet another object of the invention is to provide an information card coating device and method capable of reliably and easily operating a coating mechanism including high-performance heating means for thermally transferring a protective film to the recording surface of an information card.

A further object of the invention is to provide an information card coating device and method capable of producing a high-quality information card coated with flat layers including printing ink layers and protective films, which has excellent peel strength.

A still further object of the invention is to provide an information card coating device capable of being readily attached to or assembled into an existing card printer.

SUMMARY OF THE INVENTION

To attain the object described above according to this invention, there is provided an information card coating device comprising heating means for thermally transferring a protective film to an information card, means for feeding the protective film toward the information card, means for driving the feeding means, a decision unit for identifying the type of the protective film, data setting means in which data of optimal thermal-transfer temperatures and optimal feeding speeds pertinent to the respective protective films of plural types are set, and means for controlling and operating the driving means at the optimal thermal-transfer temperature and optimal feeding speed determined from the data set in the data setting means in accordance with the type of the protective film identified by the decision unit.

The feeding means for the protective film includes a film feed bobbin wound with a ribbon of protective film, a film take-up bobbin for winding up the protective film fed from the film feed bobbin, a ribbon sensor for detecting the protective film, and at least one mark sensor for detecting a discrimination mark indicative of the type of the protective film. By sending signals outputted from the ribbon sensor and mark sensor to the decision unit, the existence of the film is ascertained, and type of the film are recognized in the decision unit. When the mark sensor issues no marking signal while the ribbon sensor detects the film, it can be confirmed that the protective film having no discrimination mark is loaded. A situation where neither the mark sensor nor the ribbon sensor issues any signal signifies that no protective film is loaded.

By checking at least one specific mark pattern formed for each film frame defined by a recording area to be coated with the protective film on the information card, the type of the film can be recognized in the decision unit. One or more mark patterns may be formed on either or both longitudinal edge portions of the film so as to discriminate among various types of protective films.

The mark pattern formed for discrimination of the types of the protective films may also serve as positioning means for discerning the position of the frame of the protective film relative to the recording area defined on the information card.

The data about the optimal thermal-transfer temperatures and optimal feeding speeds pertinent to the protective films of various types to be discriminated by using the detected mark pattern are stored in data setting means including a memory or memories, so that the protective film is transferred to the card by operating the driving means at the optimal thermal-transfer temperature and optimal feeding speed on the basis of the output signal from the mark sensor which are indicative of the type of the protective film loaded actually.

As the heating means for thermally transferring the protective film to the card, a heating roller may be used. The surface temperature of the heating roller and the card feeding speed at which the card is transported are controlled so as to practice the determined optimal thermal-transfer temperature and feeding speed.

The heating means is movable back and forth relative to a coating-execution position prescribed on a card transport passage, so that it is evacuated from the card transport passage at a non-operation time, thus permitting the protective film to be exchanged, and assumes its film-transfer point at which the heating means comes into contact with the card at a coating operation time. When the protective film alone moves to be positioned, the heating means assume its standby point close to the film-transfer point so as to lessen misregistration of the protective film relative to the recording area on the card.

A card printer having a card coating function may be made by incorporating therein the components constituting the aforementioned information card coating device, whereas the card coating device may be independent of a card printer so that it can be attached to any existing card printer. The union of the card coating device with the card printer can easily be fulfilled by providing connection means for mutually transferring instruction signals between the coating device and the card printer so as to permit the card coating device to be handled by the card printer.

Other objects and features of the present invention will be hereinafter explained in detail with reference to the accompanying drawings.

DESCRIPTION OF THE PREFERRED EMBODIMENTS

A device according to this invention is united to a card printer for producing various sorts of ID cards such as credit cards and license cards for certifying individuals, and adapted for coating a recording surface of the ID card completed by the card printer with a protective film. According to the device and method of this invention, the condition suitable for thermally transferring the protective film to such an information card can be easily and reliably adjusted according to the material of the protective film and the purpose for which the card is used. The information card is not limited merely to a card having a plastic base, but may be of an IC card incorporating an integrated circuit.

Figure 1:
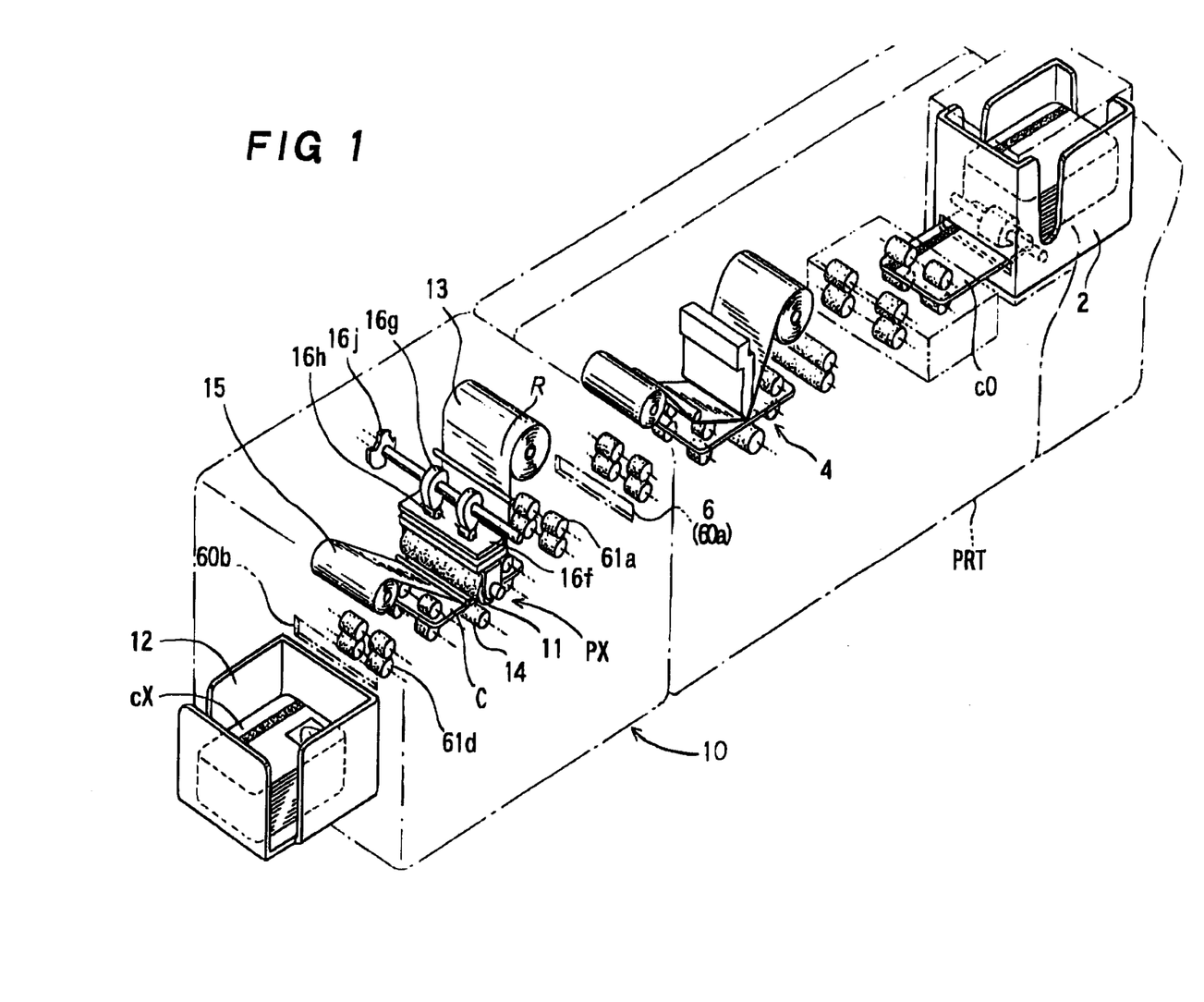
FIG. 1 is a perspective view schematically showing a structure in which the information card coating device of this invention is attached to a card printer.

The information card coating device 10 in one embodiment of this invention is connected to the card exit side of a card printer PRT for producing an information card, as schematically illustrated in FIG. 1. At a printing portion 4 in the card printer PRT, desired images such as characters, figures and photographs are printed on a recording surface of a blank card discharged from a card supply stacker 2 in which a plurality of blank cards are stored. The card thus printed is sent out through a card discharge port 6.

Figure 2:
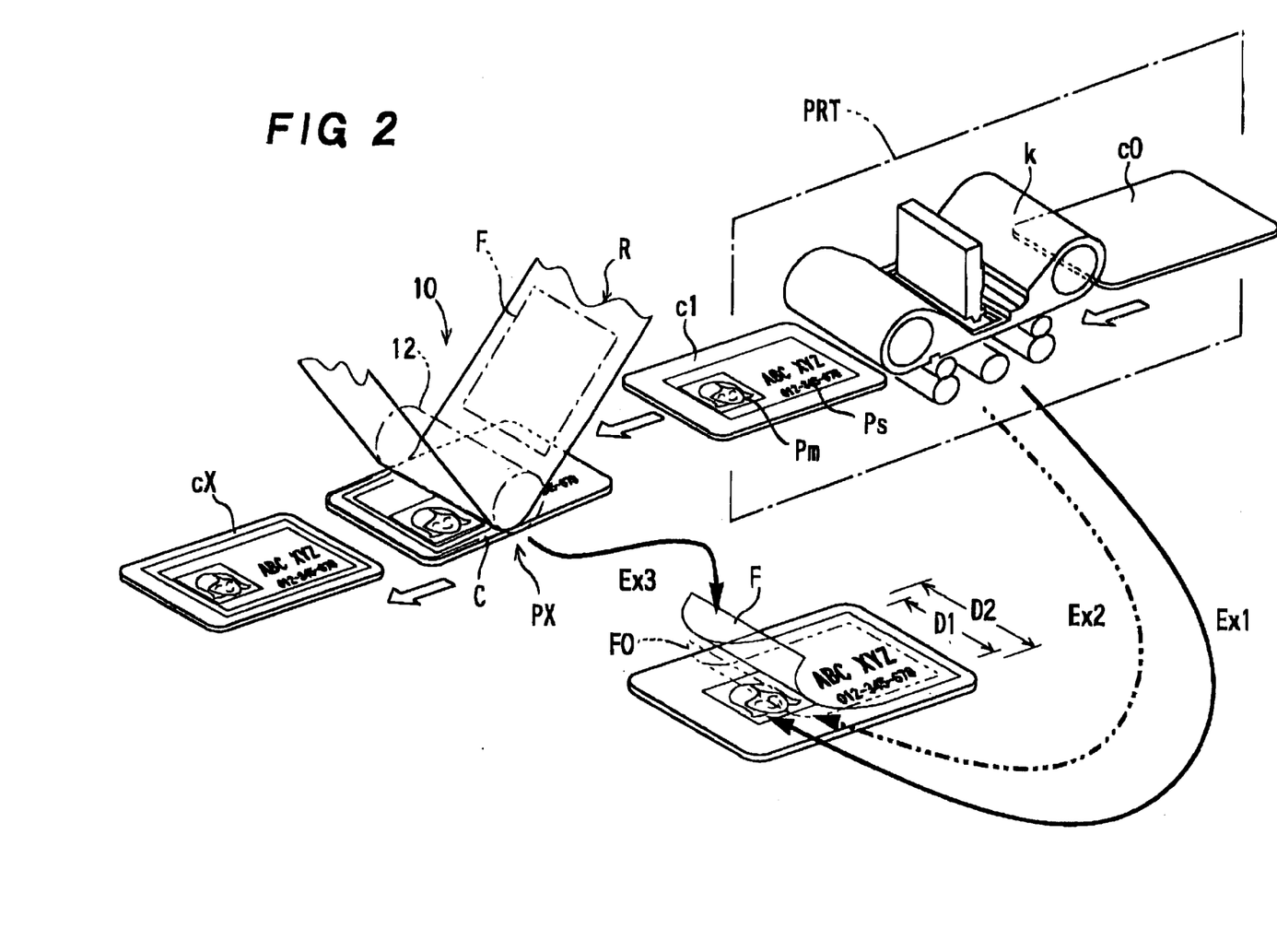
FIG. 2 is a conceptual diagram explanatory of the operating principle of the coating device and method according to this invention.

As conceptually shown in FIG. 2, in order to produce high-quality print on the card at the printing portion 4 of the card printer PRT, it is desirable to print two-gradation images Ps such as monochromatic characters and marks with a thermal-wax transfer ink, and multiple gradation images Pm such as full-color photographs with dye-sublimation thermal transfer color inks. However, these printing systems should not be understood as limitative in the invention.

To be more specific, after printing the desired images with thermal transfer ink k on the recording surface of the card (Ex1), the card is sent out to the coating device 10 according to this invention, as illustrated in FIG. 2. In some cases, the printed surface of the card is coated with a protective film F0 in the card printer PRT (Ex2), but in this embodiment, the card sent to the coating device 10 is coated with a protective film F to protect the printed surface of the card (Ex3).

The protective film F to be applied to the card recording surface in the coating device 10 is made of hot-melt material capable of melting to adhere to the card with heat or a heat resistant film applied with hot-melt adhesive. Thus, the protective film F is brought into press contact with the card C by the heating roller 11 serving as heating means in the coating device 10, consequently being thermally transferred to the card C with heat generated by the heating roller. The card C having the recording surface coated with the protective film is discharged as a completed card cX to a card discharge stacker 12.

As one example, three types of protective films F as noted below may be used in this invention.

Figure 3A:
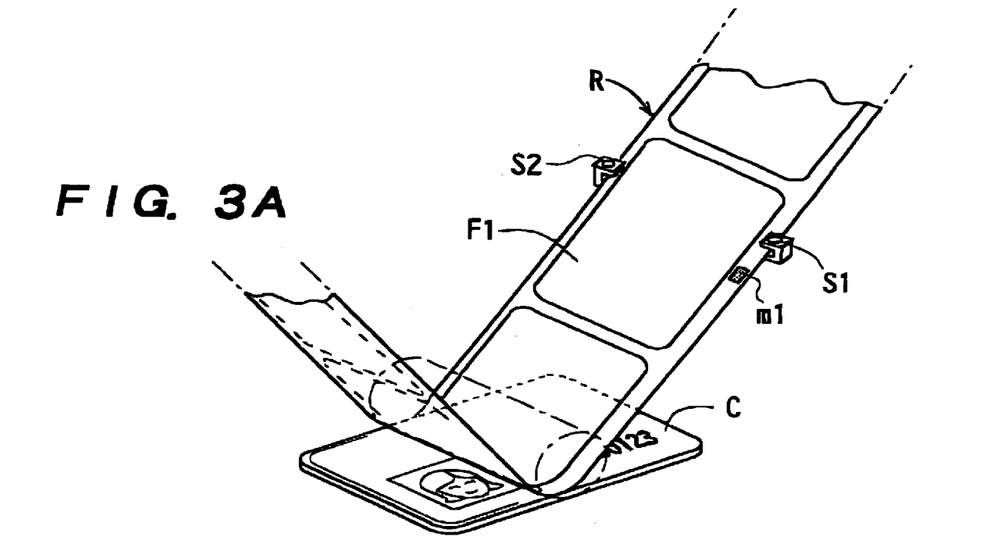
FIG. 3A through FIG. 3C are schematic diagrams explanatory of a system for discriminating different types of protective films according to this invention.

A first film (called "Type A" in this embodiment) is a relative thick high-strength reinforced plastic film which does not melt with heat of a thermal-transfer temperature at which an ordinary hot-melt protective film generally used for protecting an information card of this sort melts. This protective film may be formed into square film frames F1 of desired size so as to stick to a ribbon-like film base R with adhesive as shown in FIG. 3A. This reinforced film requires relatively large heat energy to be thermally transferred to the card. This film is referred to as "Film Type A" in this embodiment.

Figure 3B:
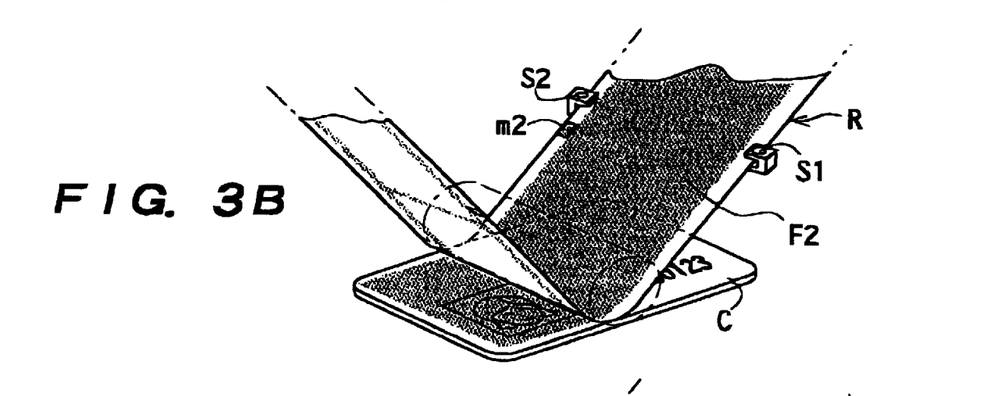

A second film (Type B) is a thin protective film F2 formed by superposing, on a film base R, a membrane layer having a thickness of several microns, which is embossed with hologram patterns, and a reflecting layer of a metal vapor membrane, as illustrated in FIG. 3B. The hologram pattern in this embodiment may be formed on a part of the film or over the substantially entire film as shown in FIG. 3B. The film F2 of Type B need not be formed into square frames equal in size to the card, inasmuch as it is thin and can melt or be transferred from the film base to the recording surface of the card by application of heat at a general thermal-transfer temperature applied customarily to a common thermal printer. In case of using a thick hologram film, it may be provided with a hot-melt adhesive layer.

Figure 3C:
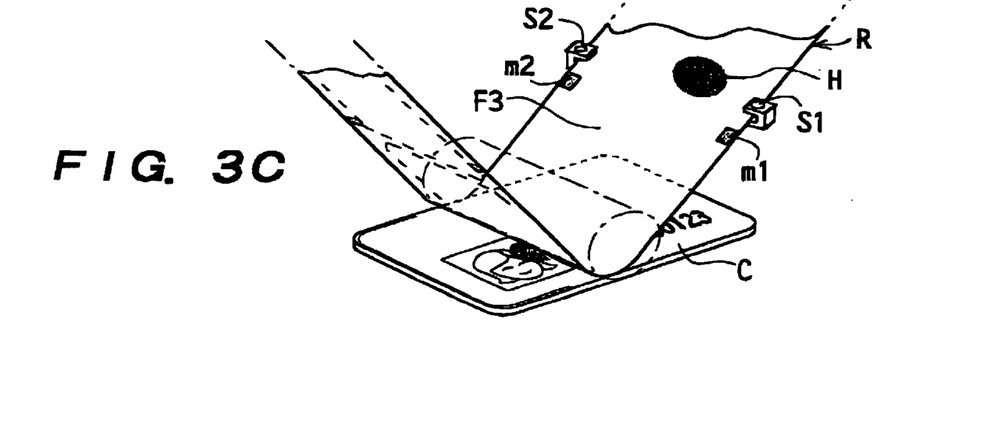

A third film (Type C) is a thin film F3 embossed partially with at least one specific hologram pattern H such as a design figure, which can melt or come off from the film base at the general thermal-transfer temperature. By affixing the protective film F3 to the card recording surface so as to place the hologram pattern H at a specific position of the printed image on the card, the hologram pattern H serves as a seal.

Although the embodiment is illustrated as using three types of protective films, the film type and structure of such protective films are not specifically limited. Various protective films can be arbitrarily applied according to the usage of the card, because the coating device according to this invention has characteristic functions of automatically identifying the type of the protective film pertinently used and automatically determining the optimal thermal-transfer temperature and optimal feeding speed in accordance with the structure and solid state properties of the protective film in use.

In order to discriminate the protective films of different types, the film base or film ribbon R of the protective film is provided on at least one longitudinal edge portion of the film with discrimination mark m1 and/or mark m2 to be detected by mark sensors S1 and S2, as shown in FIG. 3A to FIG. 3C. Thus, the type of the protective film can be definitely identified on the basis of a combination of mark signals outputted from the mark sensors as a consequence of detecting the marks.

Figure 4:
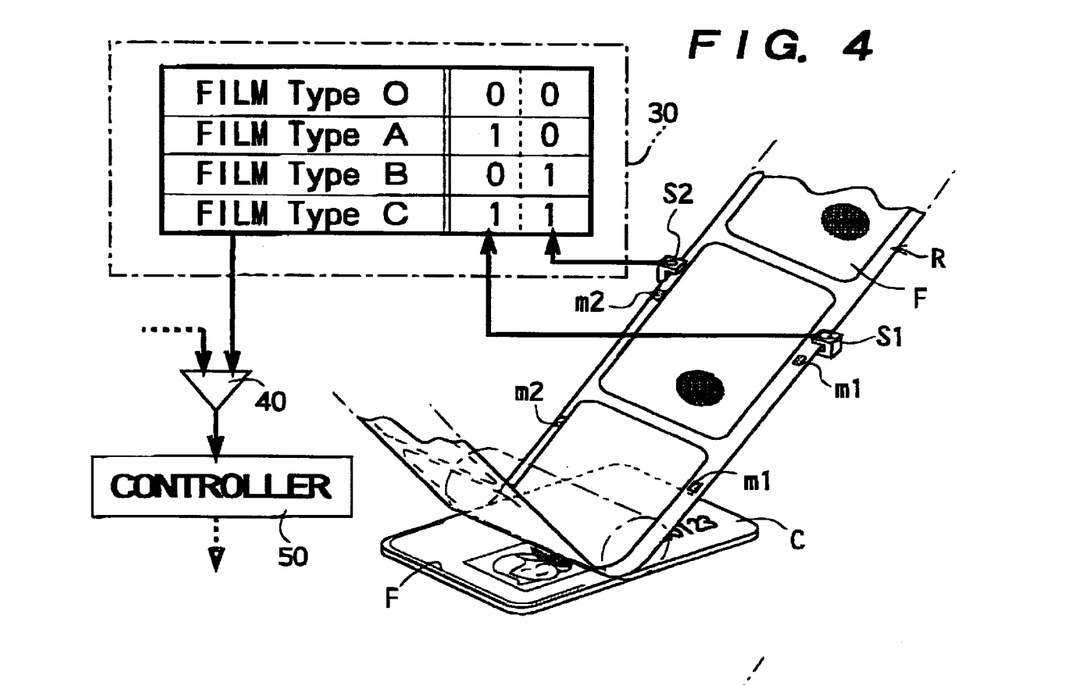
FIG. 4 is a schematic diagram explanatory of a method for discriminating different types of protective films according to this invention.

To be more specific, as shown in FIG. 4 illustrating the algorithm of the invention for identifying the type of the protective film, when the mark sensor S1 detects the mark m1 and the mark sensor S2 does not detect the mark m2 (output [10]), the film loaded is judged to be Type A (FIG. 3). In the case where the mark sensor S1 does not detect the mark m1 and the mark sensor S2 detects the mark m2 (output [01]), the film is judged Type B (FIG. 3B). When both the mark sensors m1 and m2 detect the marks m1 and m2 (output [11]), the film is judged Type C (FIG. 3C).

When neither of the mark sensors detects the discrimination marks (output [00]), it is surmised that a protective film having no discrimination mark is loaded into the coating device, or no protective film is loaded.

To confirm on whether or not the protective film is loaded in the coating device, a film feed bobbin 13 is provided with a ribbon sensor Sr for detecting the film ribbon R. This ribbon sensor Sr may detect only the rotation of the film feed bobbin 13. As a film take-up bobbin 15 rotates to roll up the film ribbon R, the feed bobbin 13 simultaneously rotates. Thus, the existence of the protective film can be recognized by checking up the rotation of the feed bobbin 13.

Accordingly, when the ribbon sensor Sr detects the film ribbon R in the state of [00] in which neither of the mark sensors S1 and S2 detects the discrimination marks, it can be deemed that the protective film having no discrimination mark is loaded in the coating device.

The situation in which no protective film is loaded is chosen not only when coating on the card is not required, but also in the case where the protective film F0 applied onto the card recording surface in the card printer PRT is further needed to be heat-treated with the heating roller 11 in the coating device 10 so as to be united with the card base more intimately.

The discrimination marks m1 and m2 made on the film base serves as positioning means for the film relative to the card C. Particularly, the discrimination marks greatly help to transfer the protective film frame F1 as illustrated in FIG. 3A to the card, or to transfer the specific pattern H formed of hologram as shown in FIG. 3C exactly to the prescribed position of the card C. Thus, it is desirable to repeatedly make the discrimination mark m1 or m2 on the film base at intervals somewhat longer than the longitudinal length of the film frame depending on the longitudinal length of the card.

Figure 5:
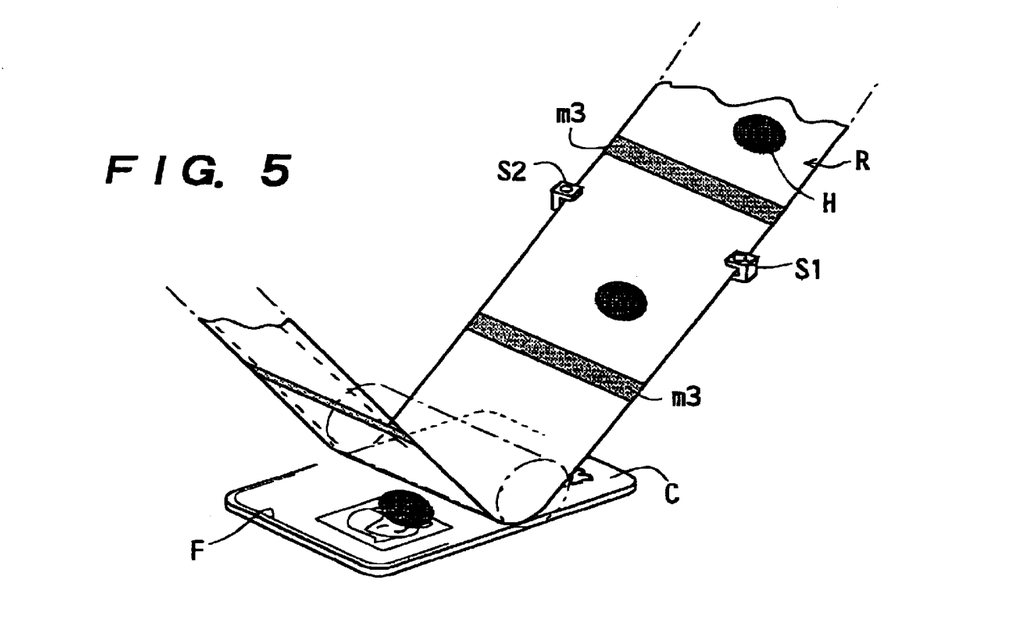
FIG. 5 is a schematic diagram showing an alternative protective film for use in this invention.

If the discrimination marks m1 and m2 together are formed on the both sides of the film as shown in FIG. 3C, they may be substituted by a stripe of mark m3 as shown in FIG. 5.

The coating device 10 of this invention basically includes a platen roller 14 opposed to the heating roller 11 serving as the heating means, lifting means 16 for moving the heating roller 11 back and forth relative to the platen roller 14, and means 17 for driving the platen roller 14, take-up bobbin 15 and lifting means 16, in addition to the film feed bobbin 13 for the film ribbon R applied with the protective film and the film take-up bobbin 15 for rolling up the film ribbon R traveling from the film feed bobbin 13 through between the heating roller 11 and platen roller 14.

A film ribbon roll of the protective film can easily be replaced by having another roll inserted into the film feed bobbin 13 from the front side of the device and connected to the film take-up bobbin 15.

In this embodiment, a halogen lamp is used as a heating source of the heating roller 11 as one example, but should not be understood as limitative.

Figure 6:
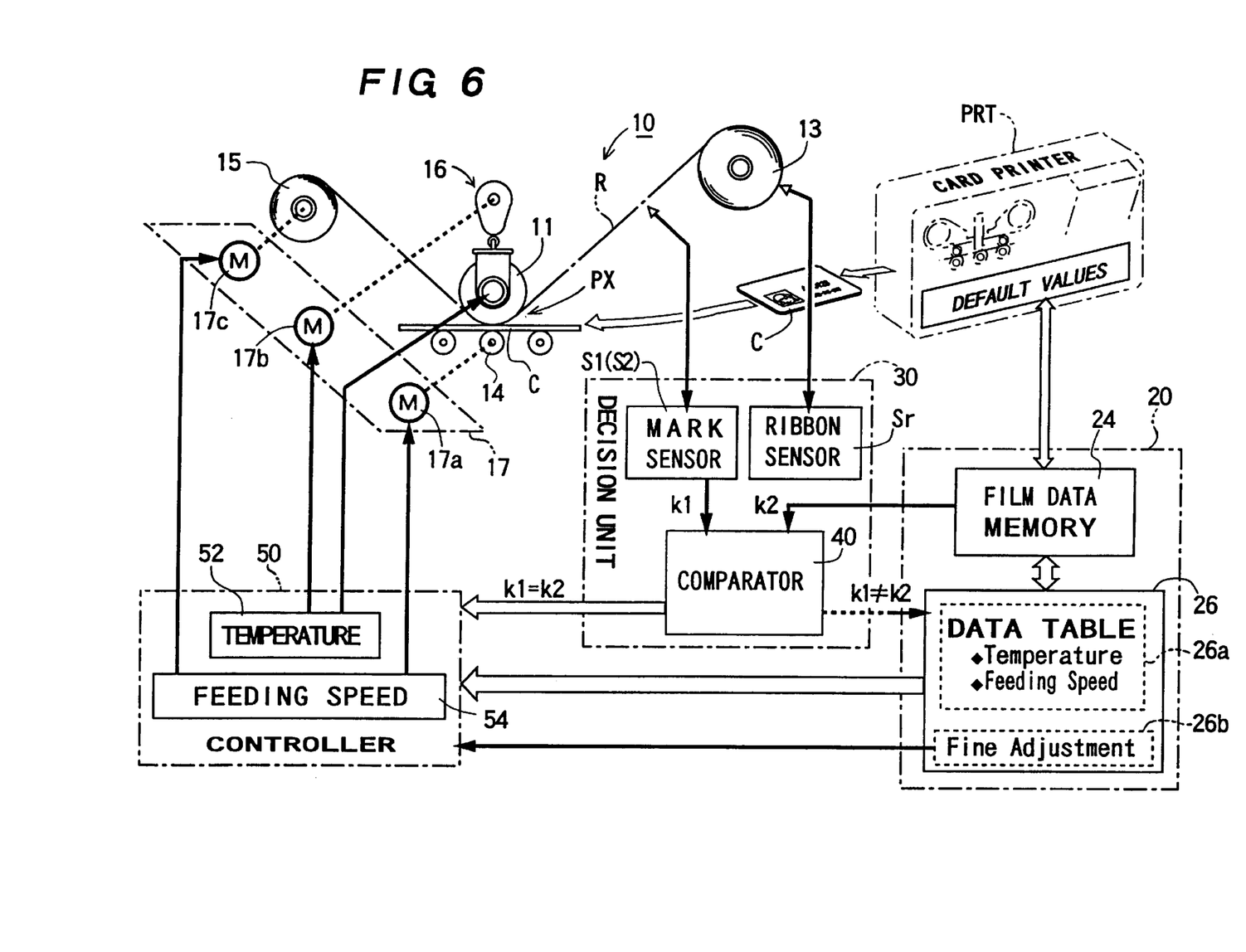
FIG. 6 is an explanatory diagram of a control system of the coating device and practicing the method of this invention.

As shown in FIG. 6, the control system of the information card coating device according to this invention comprises data setting means 20 in which information data of optimal thermal-transfer temperatures and optimal feeding speeds pertinent to the available protective films of various types are set, a decision unit 30 for identifying the type of the protective film loaded into the device in accordance with the output signals from the mark sensors S1 and S2, a comparator 40 for comparing a command signal for designating a desired protective film and the film-type indicating signal outputted from the decision unit 30, and a controller 50 for operating the driving means 17 at the optimal thermal-transfer temperature and optimal feeding speed pertinent to the designated protective film, which are set in the data setting means 20, when the protective film loaded in the device agrees with the designated protective film.

The device 10 of this invention is connected with and operated in conjunction with the card printer PRT, so that the data setting means 20 storing the aforementioned data of the optimal thermal-transfer temperatures and optimal feeding speeds pertinent to the respective protective films of various types can be freely managed by using a console panel disposed on the printer PRT. Thus, it is desirable to dispose operational inputting means including touch keys on the console panel of the printer PRT together with a display for indicating the states of instructions and operation and default values so as to enable the type of the protective film and manipulation of the coating device to be designated on the printer side.

To compensate the change in characteristic of the protective film due to quality difference in film maker, environmental conditions of usage or other possible causes, manual adjustment can be made.

That is, by designating a specific protective film on the printer PRT, sets of default values for the designated protective film are given from the printer PRT to the data setting means 20.

Thus, the data setting means 20 includes a film data memory 24 for storing the default values for the protective films of various types from which one type is designated on the printer PRT together with the data indicative of the type of a protective film used in the last coating process, and a data storage unit 26 including a data table 26a memorizing the data of the optimal thermal-transfer temperatures and optimal feeding speeds for the protective films of various types. The film data memory 24 may be formed of reprogrammable non-volatile memories such as EEP-ROM.

Upon confirming on the existence of the protective film by using the ribbon sensor Sr, the comparator 40 compares the film type k1 of the loaded protective film, which is ascertained on the basis of the output signals from the mark sensors S1 and S2, with the film type k2 of the protective film designated on the printer PRT. When both the film types agree (k1=k2), an executable instruction command is given to the controller 50.

Then, a temperature controlling driver 52 and a feeding driver 54 in the controller 50 are operated according to the data about the optimal thermal-transfer temperature and feeding speed given from the data setting means 20 to issue respective driving signals to driving means 17.

Under the control of the controller 50, the driving means 17 causes the heating roller 11 to be heated at the prescribed temperature, and the lifting means 16 to bring the heating roller 11 into contact with the card C placed on the platen roller 14 through the film ribbon R, and then, the platen roller 14 rotates to move the card C to be processed while rotating the film take-up bobbin 15 so as to permit the film ribbon R to travel along with the card C at the relative speed of zero. Consequently, the protective film F attached to the film ribbon R is thermally transferred to the card C under appropriate conditions.

When the detected film type k1 is inconsistent with the designated film type k2 (k1≠k2) as the result of comparison in the comparator 40, the default value in the printer PRT may be changed automatically in accordance with the type of the loaded protective film, or a warning sign may be displayed on the display on the printer PRT to caution an operator for the inconsistency.

Then, upon adjusting the controller 50 by a means 26b on the basis of the corrected data of the optimal thermal-transfer temperature and feeding speed, the coating of the protective film F on the card C is appropriately carried out by the operation of the driving means 17 in the same manner as above.

The recording surface of the information card C can be coated with the suitable protective film according to the method mentioned above, consequently to make it possible to keep the print on the recording surface of the card at its most suitable state and improve the strength and endurance of the card.

Next, a device for practicing the aforementioned method for appropriate coating on the information card will be described referring to FIG. 7 through FIG. 10.

Figure 7:
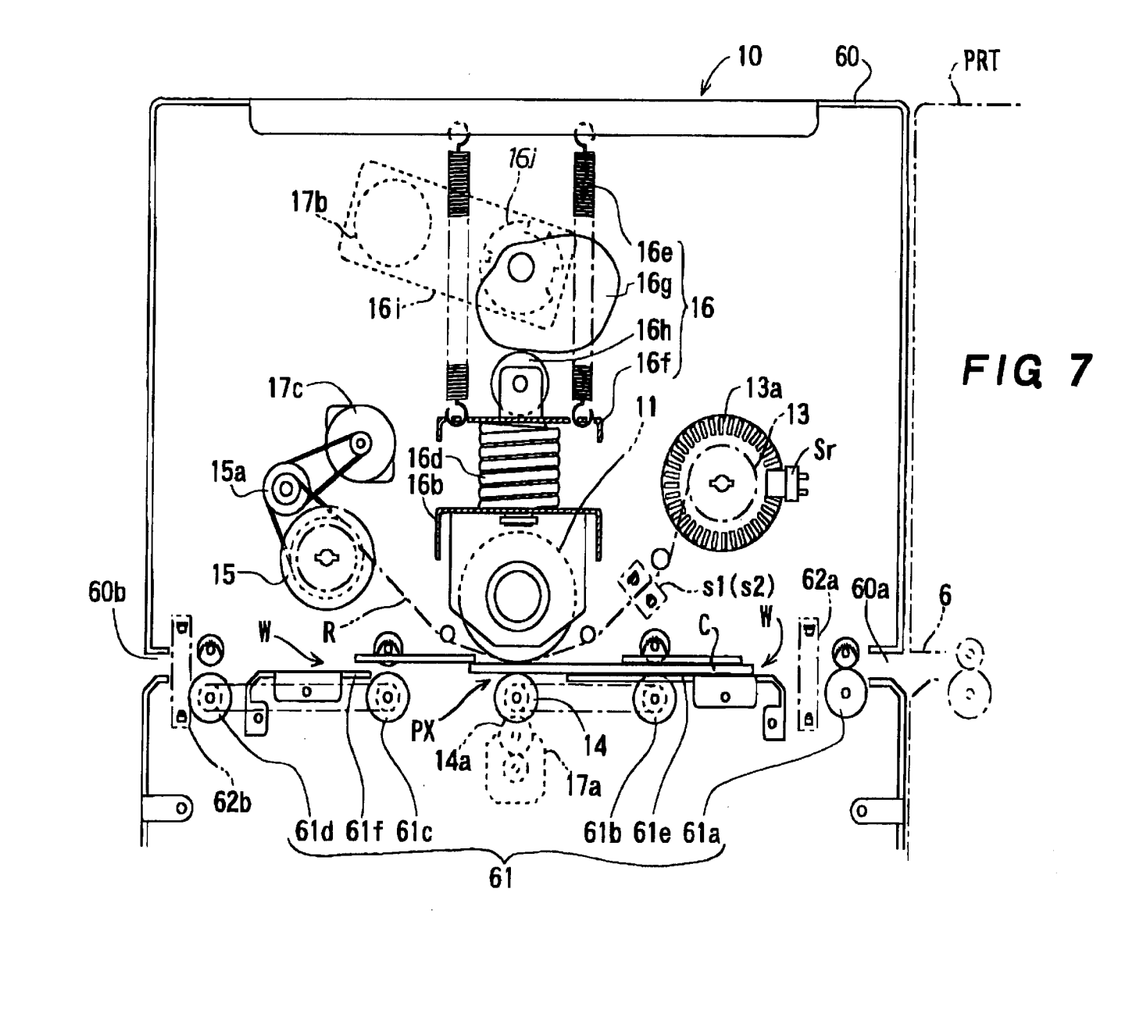
FIG. 7 is a front view explanatory of one embodiment of the coating device according to this invention.

The information card coating device 10 according to this invention comprises, in addition to the heating roller 11 and the platen roller 14 which is opposed to the heating roller 11 as touched upon above, a housing 60 having a card entrance 60a confronting the card discharge port 6 of the card printer PRT and card exit 60b formed on the opposite side of the card entrance 60a, a transport system 61 including paired entrance-side feed rollers 61a, capstan roller 61d and 61c, exit-side feed rollers 61b, and guide members 61e and 61f, an entrance card sensor 62a disposed near the card entrance 60a, and an exit card sensor 62b disposed near the card exit 60b.

The platen roller 14 is rotated with motion given from a motor 17a in he driving means 17 through a transmission means 14a including gears.

The motion for rotating the platen roller 14 is transmitted to the capstan roller 61c through a belt wheel 14b disposed on the rotational shaft of the platen roller 14 and a timing belt 14c, thus to drive the capstan roller. The other rollers 61a, 61b and 61d are also rotated with the motion from the platen roller 14 likewise. The platen roller 14 and rollers 61a–61d rotate at an equal circumferential speed.

The card C fed from the card printer PRT is sent to a coating-execution position PX by the aforesaid transport system 61, and there, coated with protective film F by means of the heating roller 11. Then, the completed card cX coated with the protective film is sent out to the card discharge stacker 12 through the card exit 60b.

Figure 8:
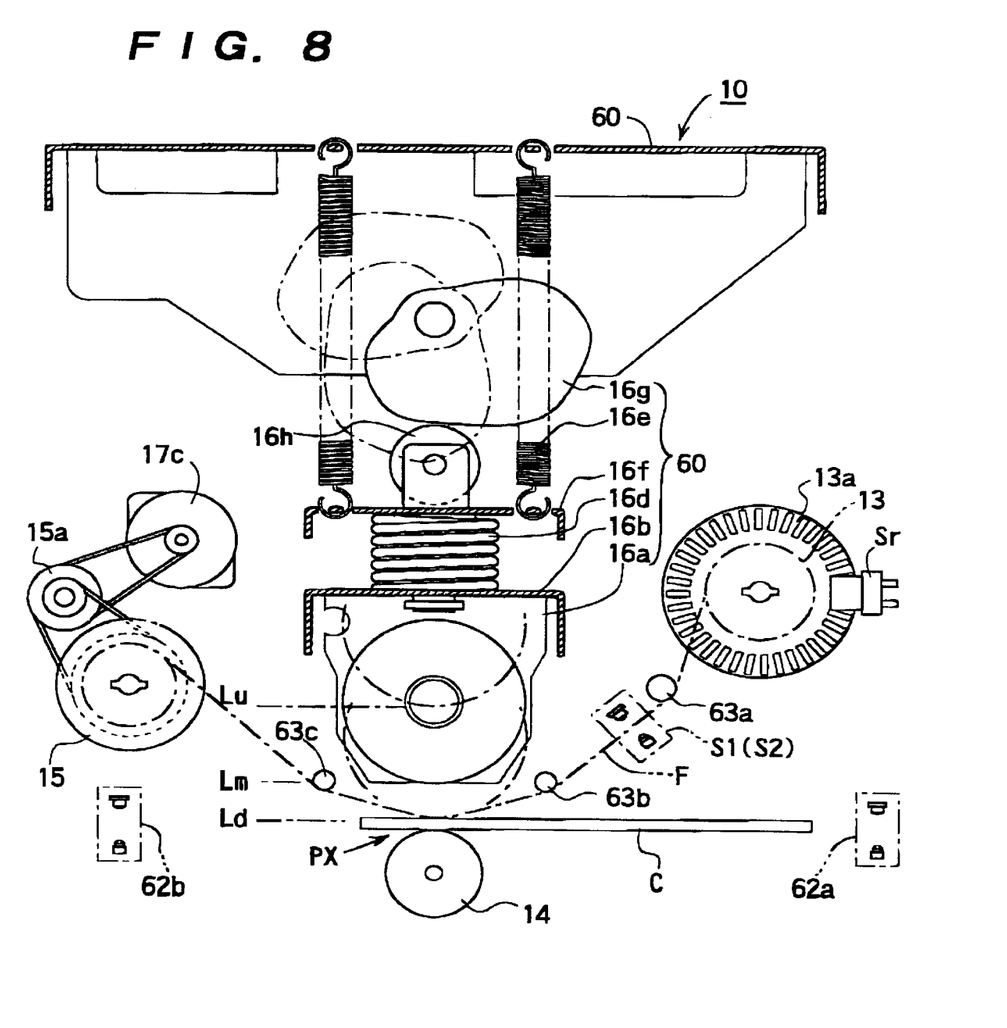
FIG. 8 is a schematic front view showing means for vertically moving a heating roller used in FIG. 7.

The heating roller 11, which brings the protective film F into press contact with the card C supported by the platen roller 14 to thermally transfer the protective film to the card, assumes its lower film-transfer point Ld when carrying out the aforesaid coating, its upper evacuation point Lu apart from the film-transfer point Ld when bringing the coating operation to a halt, and its standby point Lm at a short distance from the film-transfer point Ld when the protective film alone moves to be positioned, as indicated in FIG. 8.

In the intervals between the coating operations, the heating roller 11 does not return to the upper evacuation point Lu, but slightly moves to the standby point Lm contiguous to the film-transfer point Ld to ready for the next coating operation. Therefore, the degree of longitudinal displacement of the protective film F which is caused by vertically moving the heating roller 11 can be diminished, thus lessening an error between an objective value obtained taking account of variation and an actual value.

Figure 9:
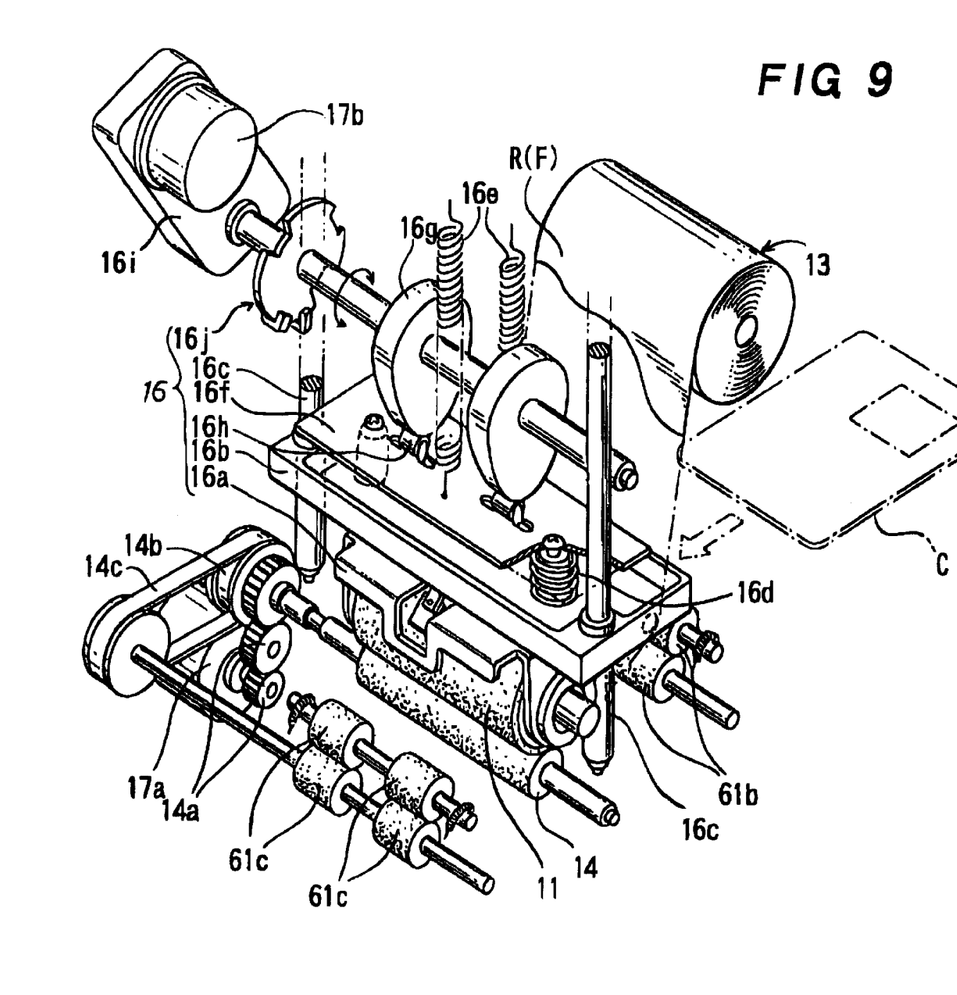
FIG. 9 is a schematic perspective view showing the means for vertically moving the heating roller used in FIG. 7.
Figure 10:
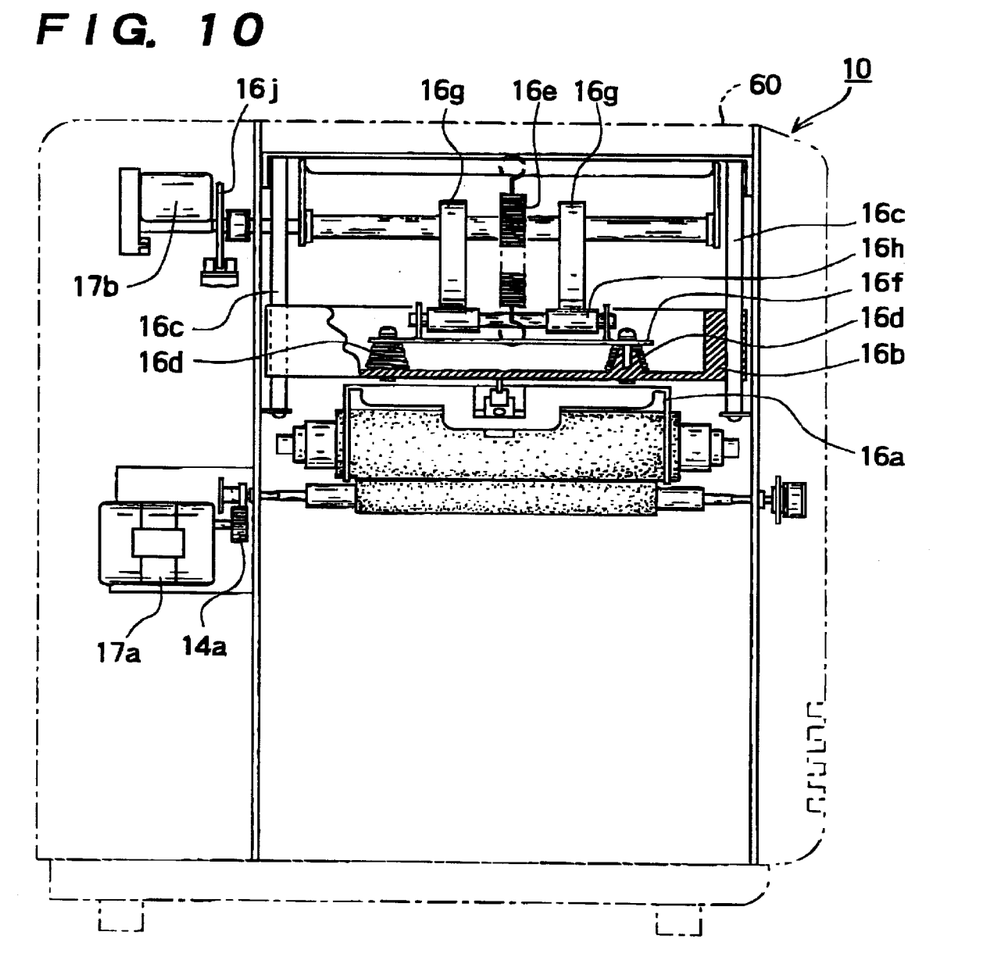
FIG. 10 is a schematic side view showing the device of FIG. 7.

The lifting means 16 for selectively positioning the heating rollers at the aforesaid upper evacuation point Lu, standby point Lm or film-transfer point Ld comprises, as shown specially in FIG. 8 and FIG. 9, a bracket 16a for rotatably holding the heating roller 11, a slide frame 16b supporting the bracket 16a, guide rods 16c for retaining vertically movably the slide frame 16b on the housing 60, a lifting member 16f suspended from the housing 60 by means of springs 16e and connected with the slide frame 16b through resilient members 16d, cams 16g mounted on the housing 60, and follower members 16h disposed on the lifting member 16f so as to move following the cams 16g.

The lifting member 16f is constantly urged upward by the springs 16e. Thus, when the follower members 16h come in contact with the minor diameter parts of the cams 16g, the heating roller 11 is held at the upper evacuation point Lu.

The follower members 16h are gradually depressed by the cams 16g with increasing the diameter parts of the cams 16g while in rotation, thus moving downward the slide frame 16b with the lifting member 16f. As a result, the heating roller 11 is moved to the standby point Lm or the lower film-transfer point Ld.

The cam 16g is rotated with rotation given from a motor 17b through the medium of a transmission means 16i.

The angular attitude of the rotating cam 16g is recognized by an angle detection means 16j disposed on the rotary shaft of the cam 16g. The angle detection means 16j in this embodiment comprises a disk with three notches formed at different circumferential intervals, which correspond to the minor, major and middle diameter parts of the cam 16g, and photo-couplers for detecting the notches, but these components are by no means limitative, and any other desired angle detector may be employed.

In FIG. 8, elements 63a, 63b and 63c are guide pins for the protective film F traveling from the film feed bobbin 13 to the film take-up bobbin 15.

The ribbon sensor Sr for checking on the existence of the protective film ribbon may be formed of a disk 13a disposed coaxially with the film feed bobbin 13 and having lots of radial slits, and a photo-coupler 13b for photoelectrically detecting the slits in the disk 13a, as shown in FIG. 7 as one example. With rotation of the disk 13a, the photo-coupler 13b issues pulse signals, thus making it possible to recognize that the film ribbon exists.

The take-up bobbin 15 is driven by a driving means having a motor 17c and a transmission means 15a including a timing belt, so that the film ribbon R is forwarded at a constant speed under the control of the aforementioned controller 50.

As described above, the card C given from the card printer PRT to the information card coating device 10 is sent to the coating-execution position PX by means of the transport system 61 and brought into press contact with the protective film F by the heating roller 11 moved downward by the lifting means 16, consequently to be coated with the protective film F with the heat of the heating roller. The finished card C thus coated with the protective film is sent out along a card transport passage W.

In the case where the card arriving at the coating-execution position for coating the protective film F on the card has already been coated with the protective film F0 at the card printer PRT, it is desirable to coat the recording surface of the card with the protective film F having a size D2 larger than the size D1 of the protective film F0 used in the coating device 10 as shown in FIG. 2.

To put it concretely, in general, only the extent in which an image or images are printed in the recording surface of the card is coated by the card printer PRT as a practical matter. That is to say, it is sufficient to coat, in the card printer PRT, at least an area Pm of a full-color photographic image which is printed on the recording surface of the card with dye-sublimation thermal transfer inks, but the protective film F to be applied to the recording surface of the card in the coating device may preferably be made larger than the area covered with the film F0 in the printer PRT, i.e. it is desired to satisfy the relation Pm>F0>F.

Figure 11:
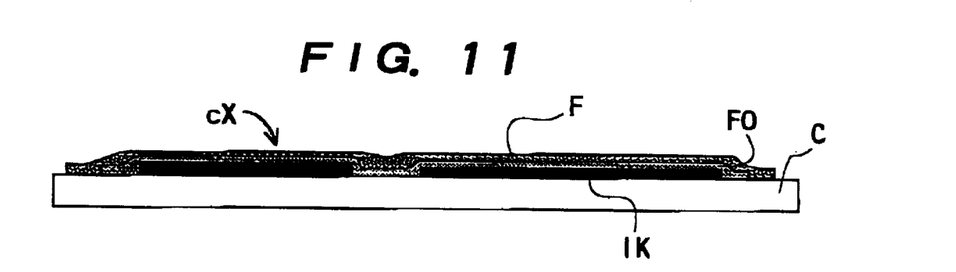
FIG. 11 is a schematic section of an information card produced by the method according to this invention.

As a consequence of making the protective film F for use in the coating device 10 larger than the protective film F0 for use in the printer PRT, an inclination of a line connecting the edges of steps formed by the peripheral portions of the protective films and ink layers lain on the recording surface of the card becomes gradual and inconspicuous as illustrated in FIG. 11. Thus, the differences in level of the edges of the ink layers IK depicting the printed images and the protective films F0 and F on the card are as small as negligible, resulting in improving the appearance of the card, heightening the peel strength of the protective film, and maintaining the printed surface of the card flat.

As is apparent from the foregoing description, according to the information card coating device of this invention, a high-quality information card, which is coated with a protective film such as a reinforced film or film with hologram pattern or patterns under the most suitable conditions, can be produced by the method of identifying the type of the protective film loaded in the device by means of the decision unit incorporating the mark sensor, and thermally transferring the protective film at the optimal thermal-transfer temperature and optimal feeding speed. Furthermore, according to this invention, the conditions pertinent to the material and characteristic of the protective film to be thermally transferred to the recording surface of the information card can be arbitrarily set automatically, consequently to easily handle and stably operate the coating device. In addition, the discrimination mark for identifying the type of the protective film serves as means for accurately determining the coating-execution position for the protective film, thus making it possible to perform highly accurate coating of the protective film on the recording surface of the card without involving dislocation. As a consequence, high-quality information card having relatively flat recording surface coated with the protective film required for the purpose can be obtained. The coating device of this invention excels in general-purpose properties as it can be applied to an existing card printer or assembled in a card printer.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An information card coating method for thermally transferring a protective film to a card held in a coating-execution position by heating operation of heating means, which comprises predetermining data of optimal thermal-transfer temperatures and optimal feeding speeds pertinent to the respective protective films of plural types, loading in said coating-execution position a protective film having one or more discrimination marks indicative of the film type or a protective film having no discrimination mark, identifying the type of the loaded protective film by checking locations of said discrimination marks or existence of said discrimination mark, determining the optimal thermal-transfer temperature and optimal feeding speed for the identified type of the protective film from said data, and driving said heating means at said determined optimal thermal-transfer temperature and optimal feeding speed, thereby to thermal transfer said protective film to said card.

2. A coating method according to claim 1, wherein said data about optimal thermal-transfer temperature and optimal feeding speed are set for a high-strength reinforced plastic film which does not melt with heat of said optimal thermal-transfer temperature, for a hologram protective film partially or substantially entirely having at least one hologram pattern, which melts with heat of said optimal thermal-transfer temperature, and for a hologram protective film partially having at least one hologram pattern of a specific image or figure, which melts with heat of said optimal thermal-transfer temperature.

3. An information card coating method for coating a card held at a coating-execution position with a protective film having one or more discrimination marks indicative of the film type or a protective film having no discrimination mark by heating operation of heating means, said method comprising:

predetermining data of optimal thermal-transfer temperatures and optimal feeding speeds pertinent to the respective protective films of plural types;

designating a type of protective film to be coated on the card;

identifying the type of a loaded protective film by checking locations of said discrimination marks or existence of said discrimination mark;

comparing the identified type of the loaded film with the designated type of film;

determining at least one of the optimal thermal-transfer temperature and optimal feeding speed for the identified type of the protective film from said data when said identified type agrees with said designated type of film so as to drive said heating means at said determined at least one of optimal thermal-transfer temperature and optimal feeding speed;

correcting the at least one of optimal thermal-transfer temperature and optimal feeding speed so as to drive said heating means at the corrected at least one of optimal thermal-transfer temperature and optimal feeding speed when said identified type is inconsistent with said designated type of film, to thermally transfer said identified protective film to said card.

4. An information card coating method for coating a card held at a coating-execution position with a protective film having one or more discrimination marks indicative of the film type or a protective film having no discrimination mark by heating operation of heating means, which comprises:

predetermining data of optimal thermal-transfer temperatures and optimal feeding speeds pertinent to the protective films of plural types, predetermining default values for correcting said optimal thermal-transfer temperature and optimal feeding speed, designating a type of protective film to be coated on the card, identifying the type of a loaded protective film by checking locations of said discrimination marks or existence of said discrimination mark, comparing the identified type of the loaded film with the designated type of film, determining the optimal thermal-transfer temperature and optimal feeding speed for the identified type of the protective film from said data so as to drive said heating means at said determined optimal thermal-transfer temperature and optimal feeding speed when said identified type agrees with said designated type of film, and changing said default value to correct the optimal thermal-transfer temperature and optimal feeding speed so as to drive said heating means at said corrected optimal thermal-transfer temperature and optimal feeding speed, when said identified type is inconsistent with said designated type of film, thereby to thermal transfer said identified protective film to said card.

5. An information card coating method for coating a card held at a coating-execution position with a protective film having one or more discrimination marks indicative of the film type or a protective film having no discrimination mark by heating operation of heating means, while feeding the protective film from a film feed bobbin to a film take-up bobbin, which comprises:

predetermining data of optimal thermal-transfer temperatures and optimal feeding speeds pertinent to the protective films of plural types, designating a type of protective film to be coated on the card, identifying the type of a loaded protective film by checking locations of said discrimination marks or existence of said discrimination mark, confirming existence of said protective film by detecting rotation of said film feed bobbin which rotates with winding the protective film around said film take-up bobbin, comparing the identified type of the loaded film with the designated type of film, determining the optimal thermal-transfer temperature and optimal feeding speed for the identified type of the protective film from said data when said identified type agrees with said designated type of film, and driving said heating means at said determined optimal thermal-transfer temperature and optimal feeding speed, thereby to thermal transfer said identified protective film to said card.

6. A coating method according to claim 5, further comprising predetermining default values for correcting said optimal thermal-transfer temperature and optimal feeding speed, so that said default value is changed to automatically or manually correct the optimal thermal-transfer temperature and optimal feeding speed so as to drive said heating means at said corrected optimal thermal-transfer temperature and optimal feeding speed, when said identified type is inconsistent with said designated type of film upon confirming the existence of said protective film.

7. A coating method according to claim 5, wherein a warning sign is issued when said identified type of the protective film loaded is inconsistent with said designated type of film upon confirming the existence of said protective film.

8. A coating method according to claim 5, further comprising driving said heating means to heat said card when no protective film loaded is detected in the process of confirming the existence of the film.

* * * * *